United States Patent
Gong

(10) Patent No.: US 11,222,107 B2
(45) Date of Patent: Jan. 11, 2022

(54) METHOD FOR UNLOCKING ELECTRONIC DEVICE, ELECTRONIC DEVICE, AND STORAGE MEDIUM

(71) Applicant: Shenzhen HeyTap Technology Corp., Ltd., Guangdong (CN)

(72) Inventor: Min Gong, Guangdong (CN)

(73) Assignee: SHENZHEN HEYTAP TECHNOLOGY CORP., LTD., Shenzhen (CN)

( * ) Notice: Subject to any disclaimer, the term of this patent is extended or adjusted under 35 U.S.C. 154(b) by 41 days.

(21) Appl. No.: 16/650,957

(22) PCT Filed: Sep. 27, 2017

(86) PCT No.: PCT/CN2017/103650
§ 371 (c)(1),
(2) Date: Mar. 26, 2020

(87) PCT Pub. No.: WO2019/061069
PCT Pub. Date: Apr. 4, 2019

(65) Prior Publication Data
US 2020/0279039 A1    Sep. 3, 2020

(51) Int. Cl.
*G06F 21/40* (2013.01)
*G06F 21/36* (2013.01)
(Continued)

(52) U.S. Cl.
CPC .............. *G06F 21/40* (2013.01); *G06F 21/36* (2013.01); *G06F 21/45* (2013.01);
(Continued)

(58) Field of Classification Search
CPC .......... G06F 21/40; G06F 21/36; G06F 21/45; G06F 21/554; G06F 21/316; G06F 21/62;
(Continued)

(56) References Cited

U.S. PATENT DOCUMENTS

2010/0190468 A1* 7/2010 Scott ................. H04M 1/72457
455/404.2
2012/0174214 A1* 7/2012 Huang ..................... G06F 21/32
726/19
(Continued)

FOREIGN PATENT DOCUMENTS

CN     103885772 A    6/2014
CN     102663314 B    6/2015
(Continued)

OTHER PUBLICATIONS

Search report for EP application 17926471.8 dated Jun. 9, 2020.
English translation of ISR for PCT application PCT/CN2017/103650 dated Jul. 4, 2018.

*Primary Examiner* — Nelson S. Giddins
(74) *Attorney, Agent, or Firm* — Young Basile Hanlon & MacFarlane, P.C.

(57) ABSTRACT

A method for unlocking an electronic device may include: receiving actual unlocking information from a locked screen interface; and comparing the actual unlocking information with preset emergency unlocking information and preset normal unlocking information, wherein if the actual unlocking information is the normal unlocking information, an electronic device is unlocked, or if the actual unlocking information is the emergency unlocking information, an emergency operation is executed.

16 Claims, 4 Drawing Sheets a dynamic use state of the electronic device is analyzed according to an input condition of the emergency unlocking information on the locked screen interface to obtain an analysis result — 210 when it is determined that the emergency unlocking information is inputted more than once on the locked screen interface, and a distance between the positions where the electronic device is located when the unlocking information is received twice adjacently from the locked screen interface is greater than a preset threshold, the emergency unlocking information is set to be invalid — 221

(51) Int. Cl.
  *G06F 21/45*    (2013.01)
  *H04W 12/63*    (2021.01)
  *H04W 12/06*    (2021.01)
  *H04M 1/72418*  (2021.01)
  *H04M 1/72466*  (2021.01)

(52) U.S. Cl.
  CPC ... *H04M 1/72418* (2021.01); *H04M 1/72466* (2021.01); *H04W 12/63* (2021.01)

(58) Field of Classification Search
  CPC ......... H04M 1/72418; H04M 1/72466; H04W 12/082; H04W 12/06; H04W 12/63
  See application file for complete search history.

(56) References Cited

U.S. PATENT DOCUMENTS

| | | |
|---|---|---|
| 2013/0014250 A1 | 1/2013 | Brown et al. |
| 2015/0156313 A1 | 6/2015 | Zeng et al. |
| 2015/0269374 A1 | 9/2015 | Fan et al. |
| 2015/0319294 A1* | 11/2015 | Sudhir .................. G06F 21/74 455/411 |

FOREIGN PATENT DOCUMENTS

| | | |
|---|---|---|
| CN | 106650476 A | 5/2017 |
| WO | 2016034090 A1 | 3/2016 |

* cited by examiner

METHOD FOR UNLOCKING ELECTRONIC DEVICE, ELECTRONIC DEVICE, AND STORAGE MEDIUM

CROSS-REFERENCE TO RELATED APPLICATION(S)

This application is a 371 application of International Application No. PCT/CN2017/103650, filed on Sep. 27, 2017, the entire disclosure of which is hereby incorporated by reference.

TECHNICAL FIELD

The present disclosure relates to a field of mobile communication technologies, and more particularly, to a method for unlocking an electronic device, an electronic device, and a storage medium.

BACKGROUND

With the continuous development of technology, electronic devices play an important role in people's lives. Taking a mobile phone as an example, a large amount of private information (such as bound bank card information) may be stored on the mobile phone, once the user is forced to provide an unlock password to a criminal, massive economic losses may be caused, for example, the risk of theft of bank card funds bound to mobile phones.

SUMMARY

Embodiments of the present disclosure provide a method for unlocking an electronic device, an electronic device, and a storage medium.

The method for unlocking an electronic device, includes: receiving actual unlocking information from a locked screen interface; and comparing the actual unlocking information with preset emergency unlocking information and preset normal unlocking information, unlocking the electronic device when the actual unlocking information is the normal unlocking information, and executing an emergency operation when the actual unlocking information is the emergency unlocking information.

An electronic device including a memory and a processor, in which a computer program is stored in the memory, and when the program is executed by the processor, the processor is caused to: receive actual unlocking information from a locked screen interface; and compare the actual unlocking information with preset emergency unlocking information and preset normal unlocking information, unlock the electronic device when the actual unlocking information is the normal unlocking information, and execute an emergency operation when the actual unlocking information is the emergency unlocking information.

One or more non-volatile storage media comprising computer-executable instructions, in which when the computer-executable instructions are executed by one or more processors, the one or more processors are caused to: receive actual unlocking information from a locked screen interface; and compare the actual unlocking information with preset emergency unlocking information and preset normal unlocking information, unlock the electronic device when the actual unlocking information is the normal unlocking information, and execute an emergency operation when the actual unlocking information is the emergency unlocking information.

BRIEF DESCRIPTION OF DRAWINGS

In order to explain the technical solutions in the embodiments of the present disclosure or the related art more clearly, the drawings used in the description of the embodiments or the related art will be briefly introduced below. Obviously, the drawings in the following description are merely some embodiments of the present application. For those of ordinary skill in the art, without any inventive works, drawings of other embodiments can be obtained according to these drawings.

DETAILED DESCRIPTION

In order to facilitate understanding of the present disclosure, the present disclosure will be described more fully below with reference to the related drawings. The drawings show a preferred embodiment of the present disclosure. However, this disclosure can be implemented in many different forms and is not limited to the embodiments described herein. Rather, these embodiments are provided to provide a thorough and comprehensive understanding of the disclosure of this application.

Unless defined otherwise, all technical and scientific terms used herein have the same meaning as commonly understood by one of ordinary skill in the art to which this disclosure belongs. The terminology used in the description of the disclosure herein is for the purpose of describing particular embodiments only and is not intended to limit the disclosure. The term "and/or" as used herein includes any and all combinations of one or more of the associated listed items.

It can be understood that the terms "first", "second", and the like used in this application can be used herein to describe various components, but these components are not limited by these terms. These terms are only used to distinguish a first components from another component. For example, without departing from the scope of the present disclosure, a first client may be referred to as a second client, and similarly, the second client may be referred to as the first client. The first client and the second client are both clients, but not the same client.

Figure 2:
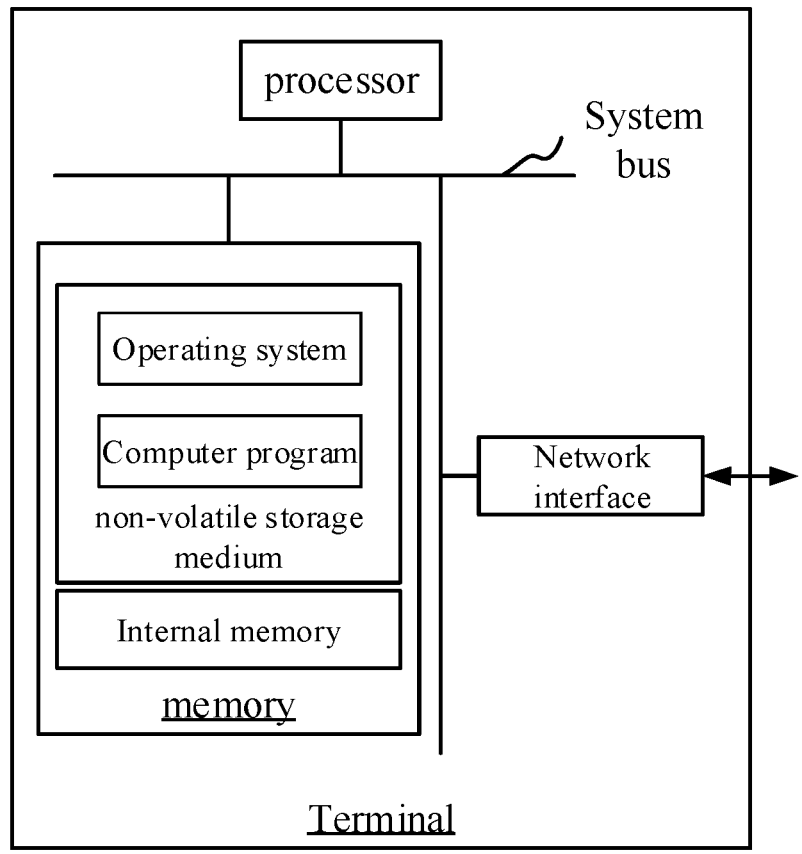
FIG. 2 is a schematic diagram of an internal structure of an electronic device for implementing the method for unlocking an electronic device according to the embodiment illustrated in FIG. 1.

An embodiment provides a method for unlocking an electronic device, which can be executed by an electronic device having data processing capabilities. FIG. 2 is a schematic diagram of an internal structure of an electronic device according to an embodiment of the present disclosure. As illustrated in FIG. 2, the electronic device includes a processor and a memory connected through a system bus. Further, a network interface may also be included. The processor is configured to provide computing and control capabilities to support an operation of an entire electronic device. The memory is configured to store data, programs, and the like. At least one computer program is stored on the memory, and the computer program can be executed by the processor to implement the method for unlocking the electronic device according to the embodiments of the present disclosure. The memory may include a non-volatile storage medium such as a magnetic disk, an optical disk, a read-only memory (ROM), or a random-access memory (RAM). For example, in an embodiment, the memory includes a non-volatile storage medium and an internal memory. The non-volatile storage medium stores an operating system and a computer program. The computer program may be executed by a processor to implement the method for unlocking an electronic device according to each of the following embodiments. The internal memory provides a cached operating environment for computer programs of an operating system in the non-volatile storage medium. The network interface may be an Ethernet card or a wireless network card, and is configured to communicate with external electronic devices. The electronic device may be a mobile phone, a tablet computer, a personal digital assistant or a wearable device. Those skilled in the art can understand that the structure shown in FIG. 2 is only a block diagram of a part of the structure related to the solution of the present application, and does not constitute a limitation on the electronic device to which the solution of the present application is applied. A specific electronic device may include more or fewer components than shown in the figure or a combination of certain components, or have a different component arrangement.

Figure 1:
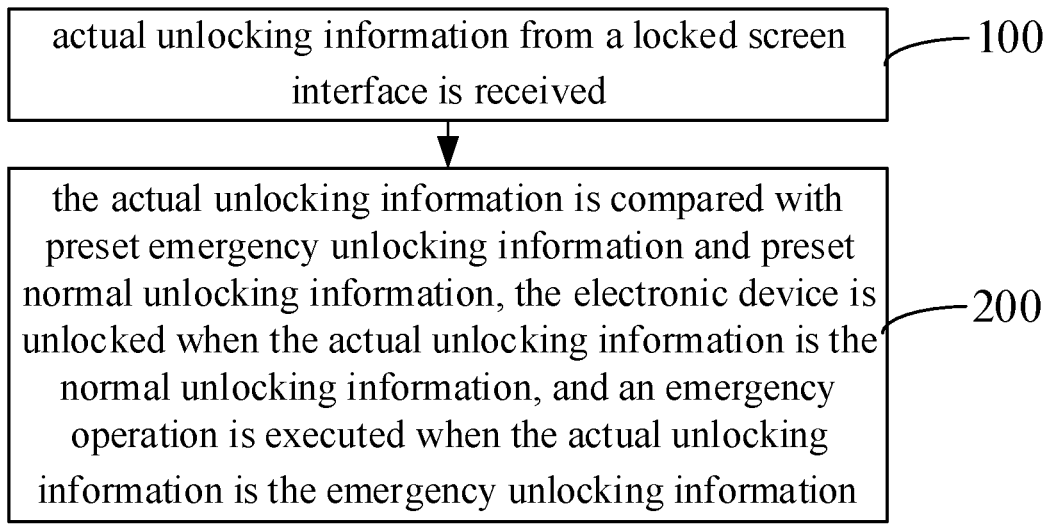
FIG. 1 is a flowchart of a method for unlocking an electronic device according to an embodiment of the present disclosure.

As illustrated in FIG. 1, the method for unlocking the electronic device according to the embodiment has the following steps.

At block 100, actual unlocking information from a locked screen interface is received.

The actual unlocking information refers to unlocking information input by a user (that is, the owner of an electronic device), a criminal, or others into the locked screen interface of the electronic device. The unlocking information includes, for example, an unlocking password or a combination of the unlocking password and other information, for example, a combination of an unlocking password and gesture information.

At block 200, the actual unlocking information is compared with preset emergency unlocking information and preset normal unlocking information, the electronic device is unlocked when the actual unlocking information is the normal unlocking information, and an emergency operation is executed when the actual unlocking information is the emergency unlocking information.

The emergency unlocking information is different from the normal unlocking information, but both can be set in the electronic device by the user in advance. The normal unlocking information is used under normal circumstances, and the emergency unlocking information is used under emergency situations. Specifically, the emergency unlocking information may be information generated after the electronic device is unlocked by the user through the normal unlocking information. In other words, the emergency unlocking information can be set by the user under normal circumstances. For example, in normal use, the user unlocks the electronic device through the normal unlocking information. After the electronic device is successful unlocked, an emergency unlocking password is set at an entrance in the electronic device, for example, the electronic device may be a mobile phone, an option of an emergency unlocking function can be added to the settings in the mobile phone, and the user can set the emergency unlocking information in this option.

If the actual unlocking information is the normal unlocking information, in a normal use situation, when the normal unlocking information is imputed by the user, the electronic device can be normally unlocked for the user's normal use. If the actual unlocking information is the emergency unlocking information, in an emergency situation, for example, when the user is forced by criminals, the user can provide the criminals with the emergency unlocking information. Therefore, the inputter of the emergency unlocking information on the locked screen interface is most likely to be a criminal. At this time, the electronic device can ensure the security of the electronic device information as much as possible through emergency operations. For example, after the unlocking information is obtained, the criminals usually move to a safe place to steal user data or transfer funds in the electronic device. Therefore, the criminals are enabled to use emergency unlocking information to unlock the electronic device at the place where the criminals are coercing the user to ensure the safety of the user. After detecting that the criminals have moved, corresponding measures can be taken to prevent the criminals from illegal behaviors such as stealing funds, which can protect the security of user funds to a certain extent on the premise of protecting the security of users.

Therefore, when the user uses electronic devices normally, the electronic devices can be unlocked using the normal unlocking information. In case of an emergency, such as being forced by criminals, the emergency unlocking information can be provided to the criminals. At this time, the electronic devices can take corresponding protection measures by adopting emergency operations, thereby improving the security of the electronic devices.

Figure 3:
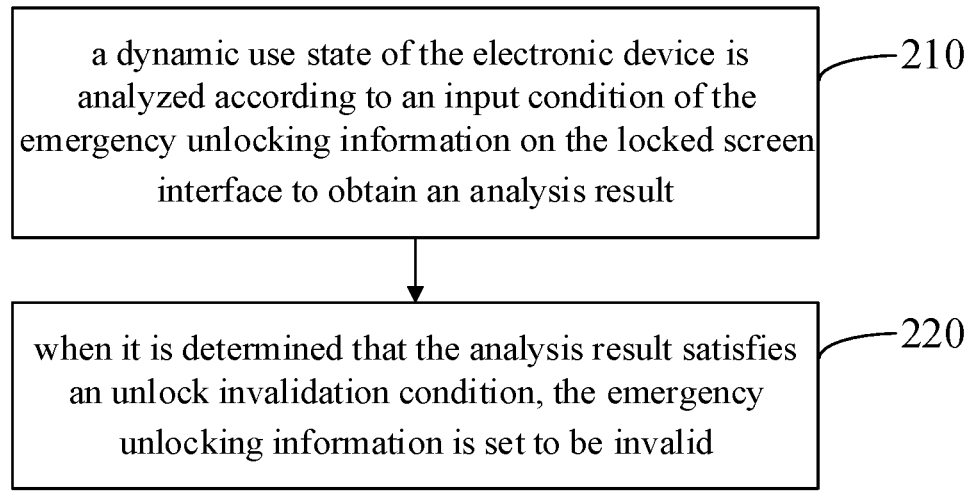
FIG. 3 is a flowchart of an example of act in block 200 in the method for unlocking an electronic device according to the embodiment illustrated in FIG. 1.

In an embodiment, executing the emergency operation in the above act in block 200 includes the following acts, please refer to FIG. 3.

At block 210, a dynamic use state of the electronic device is analyzed according to an input condition of the emergency unlocking information on the locked screen interface to obtain an analysis result.

Since the emergency unlocking information on the locked screen interface is likely to be entered by criminals, according to the input condition of the emergency unlocking information on the locked screen interface, real-time dynamics use state of the electronic device by criminals can be obtained. Specifically, the input condition of the emergency unlocking information on the locked screen interface includes, for example, the number of times the emergency unlocking information is input, and the position of the electronic device when the emergency unlocking information is input on the locked screen interface.

At block 220, when it is determined that the analysis result satisfies an unlock invalidation condition, the emergency unlocking information is set to be invalid, wherein, when the emergency unlocking information is invalid, the electronic device fails to be unlocked.

When the analysis result satisfies the unlock invalidation condition, the criminals are more likely to perform operations such as stealing user data or transferring funds in the electronic device. At this time, by setting the emergency unlocking information to be invalid, illegal behaviors that performed by the criminals can be prevented.

Specifically, at block 220, when it is determined that the analysis result satisfies the unlock invalidation condition, the emergency unlocking information is set to be invalid, and a prompt message is displayed. The prompt message can be, for example, "wrong password". It is understood that the method for prompting the invalidity of the emergency unlocking information is not limited to the above-mentioned situation, and for example, the sound prompting is also available.

It is understood that the specific implementation of the emergency operation at block 200 is not limited to the above, as long as the personal safety of the user is ensured and illegal acts of the criminals can be prevented. For example, according to the analysis results, when it is determined that the criminal successfully unlocks the electronic device after entering the emergency unlocking information through the locked screen interface for the first time, the electronic device may send a distress signal and a real-time location information of the electronic device to a pre-bound emergency contact or the police call "110" for help.

Figure 4:
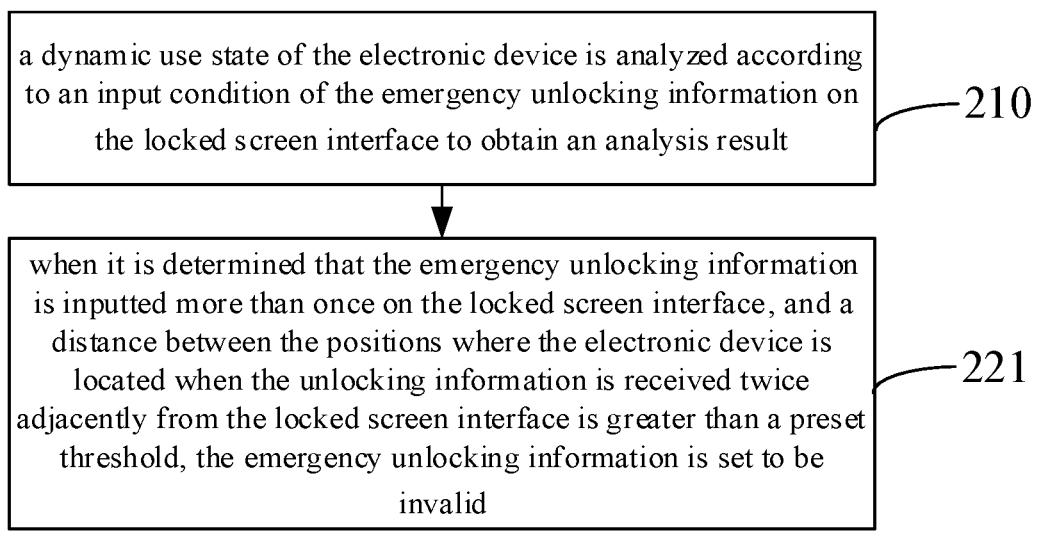
FIG. 4 is a flowchart of another embodiment of act in block 200 according to the embodiment illustrated in FIG. 3.

Specifically, as illustrated in FIG. 4, the above act in block 220 includes the following steps.

At block 221, when it is determined that the emergency unlocking information is inputted more than once on the locked screen interface, and a distance between the positions where the electronic device is located when the unlocking information is received twice adjacently from the locked screen interface is greater than a preset threshold, the emergency unlocking information is set to be invalid.

The reason of setting the number of inputting the emergency unlocking information on the locked screen interface to be more than once is to consider that if the user is coerced to inform the unlocking information, the criminals usually tend to confirm the accuracy of the information notified by the user, that is, when the electronic device receives the emergency unlocking information from the locked screen interface for the first time, the emergency unlocking information may be input into the electronic device by the criminal for verification after learning the emergency unlocking information. At this time, unlocking operations may be performed to gain the trust of the criminals, to ensure the personal safety of the user.

When the criminals are about to steal data or transfer funds, they are likely to be moved to another safe place for execution. Therefore, when the criminals re-enter the emergency unlocking information after transferring to another place, the emergency unlocking information is received by the electronic device for more than once, and there is a long distance between the current position of the electronic device (that is, the place where the criminal moved to) when the emergency unlocking information is currently input and the position of the electronic device (the place where the user is coerced by the criminal) when the emergency unlock information is last entered. Therefore, when it is determined that the emergency unlocking information is inputted more than once on the locked screen interface, and the distance between the positions where the electronic device is located when the unlocking information is received twice adjacently from the locked screen interface is greater than the preset threshold, it indicates that the criminals have moved to another place and are about to perform illegal acts. Therefore, through the above act in block 221, the criminals are unable to unlock the electronic device after entering the emergency unlocking information on the electronic device at the place after the transfer, thereby reducing the probability of the criminals stealing user data or transferring funds, and improving the security of the data of the electronic device.

Specifically, before receiving the emergency unlocking information for the first time on the locked screen interface, the state of the emergency unlocking information is valid. The valid emergency unlocking information means that the emergency unlocking information is available, for example, it is ensured that the electronic device can be unlocked after the emergency unlocking information is input for the first time on the locked screen interface of the electronic device.

The emergency unlocking information received for the first time on the locked screen interface may be, for example, the emergency unlocking information inputted by the criminal for the first time. Therefore, before the emergency unlocking information is received for the first time on the locked screen interface, the state of the emergency unlocking information is valid, which means that the emergency unlocking information is in a valid state before being used on the electronic device by criminals. For example, the user can set the emergency unlocking information to be valid under normal use, or the electronic device defaults the emergency unlocking information to be valid after leaving the factory.

Figure 5:
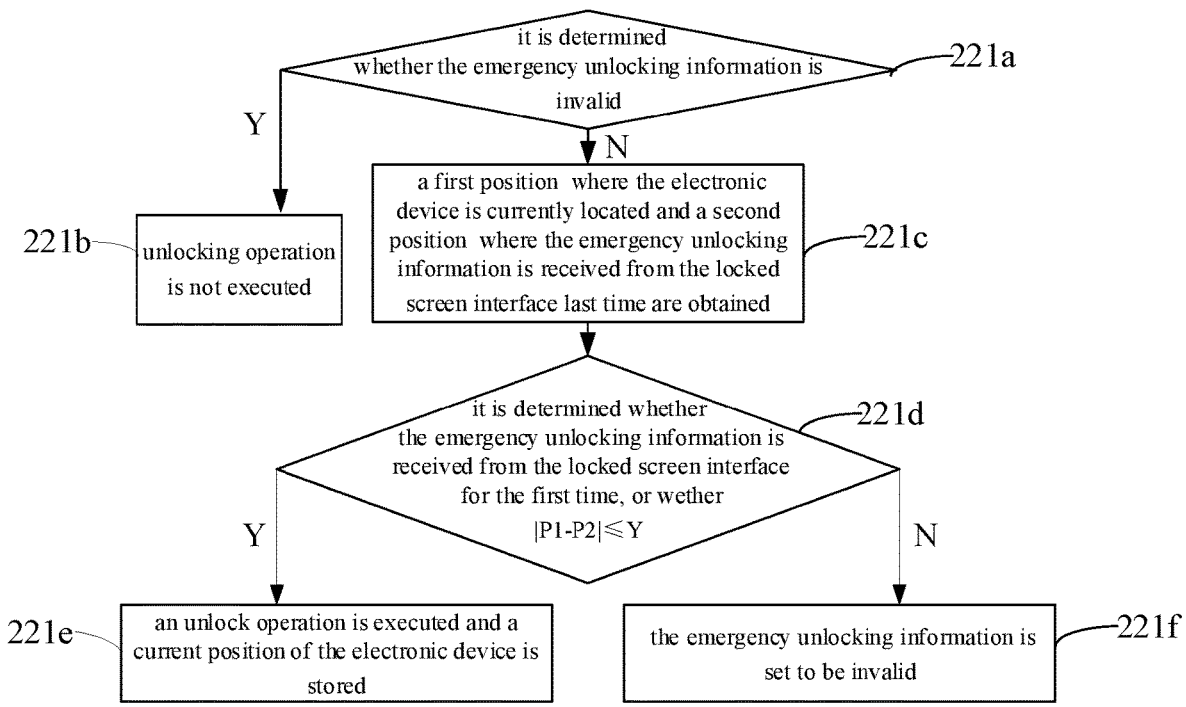
FIG. 5 is a flowchart of an embodiment of act in block 221 according to the embodiment illustrated in FIG. 4.

In addition, as illustrated in FIG. 5, the above act in block 221 specifically includes the following content.

At block 221*a*, it is determined whether the emergency unlocking information is invalid, when the emergency unlocking information is valid, act in block 221*b* is executed, otherwise act in block 221*c* is executed.

The states of the emergency unlocking information include the valid state and the invalid state. Since the emergency unlock information is valid before the emergency unlocking information is received on the locked screen interface of the electronic device for the first time, when the criminal inputs the emergency unlocking information into the electronic device for the first time, the electronic device executes act in block 221*a* and continues to execute act in block 221*c*.

At block 221*b*, unlocking operation is not executed.

At block 221*c*, a first position P1 where the electronic device is currently located and a second position P2 where the emergency unlocking information is received from the locked screen interface last time are obtained.

The position of the electronic device may be acquired through global positioning system (GPS) or wirelessly transferred to the electronic device by other devices.

At block 221*d*, it is determined whether the emergency unlocking information is received from the locked screen interface for the first time, or the distance between the first position and the second position is less than or equal to the preset threshold (i.e., |P1−P2|≤Y, Y is the preset threshold), if yes, act in block 221*e* is executed, otherwise act in block 221*f* is executed.

If yes, which means that the emergency unlocking information is received from the locked screen interface for the first time, or the distance between the first position and the second position is less than or equal to the preset threshold, the criminals have not transferred to a safe place. For example, after the criminals threatened the user and obtained the emergency unlocking information from the user, the criminals entered the emergency unlocking information to determine whether the user was lying. Otherwise, when it is determined that the emergency unlocking information is not received from the locked screen interface for the first time, or the distance between the first position and the second position is greater than the preset threshold, in this situation, it is most likely that the criminals has threated the user and transferred to a safe place for inputting the emergency unlocking information and are about to execute illegal acts.

Specifically, the act of "determining whether the emergency unlocking information is received from the locked screen interface for the first time" may be performed by using, for example, the following methods. The user sets the second position P2 to a set constant (for example, 0) under normal use conditions, and then at block 221d, it is determined whether the second position P2 is a set constant, if yes, it means that the emergency unlocking information is received for the first time, and act in block 221e is performed, otherwise, the emergency unlocking information is not received for the first time, and then it is continued to determine whether the distance between the first position and the second position is less than or equal to the preset threshold, if the distance between the first position and the second position is less than or equal to the preset threshold, act in block 221e is executed, otherwise, act in block 221f is executed.

At block 221e, an unlock operation is executed.

Specifically, at the above block 221e, an unlock operation is executed and a current position of the electronic device is stored. In this way, when the emergency unlocking information is received next time, the position of the electronic device after the emergency unlocking information is received last time can be directly read. It is understood that the method for obtaining the position of the electronic device after receiving the emergency unlocking information last time is not limited to the above-mentioned situation, and for example, it may also be wirelessly transferred by other devices to the electronic device.

At block 221f, the emergency unlocking information is set to be invalid.

Therefore, under normal use, the user can use the normal unlocking information to unlock the phone, and the emergency unlocking information is set to be valid, and the second position is a set constant. When the user is coerced by a criminal, the user can inform the criminal of the emergency unlocking information. After the criminals input the emergency unlocking information for the first time, since the initial state of the emergency unlocking information is valid and the conditions for receiving the emergency unlocking information are met for the first time, the electronic device is successfully unlocked, so that the criminals confirm that the emergency unlocking information can be used to ensure the personal safety of users. If the criminal transfers to a safe place and re-enters the emergency unlocking information to plan to steal data from the electronic device or perform illegal acts such as fund transfer, then the condition |P1−P2|>Y is satisfied at this time, the electronic device sets the emergency unlocking information to be invalid, thus the criminals cannot successfully unlock the electronic device again. No matter how many times the criminals enter the emergency unlocking information, because the emergency unlocking information is already in an invalid state, the criminals cannot successfully unlock the electronic device.

It should be noted that FIG. 1, FIG. 3 to FIG. 5 are flowcharts of the method according to the embodiment of the present disclosure. It is understood that although the steps in the flowcharts of FIG. 1, FIG. 3 to FIG. 5 are sequentially displayed according to the directions of the arrows, these steps are not necessarily performed sequentially in the order indicated by the arrows. Unless explicitly stated herein, the execution of these steps is not strictly limited, and can be performed in other orders. Moreover, at least a part of the steps in FIG. 1, FIG. 3 to FIG. 5 may include multiple sub-steps or stages. These sub-steps or stages are not necessarily performed at the same time, but may be performed at different times. The execution order is not necessarily performed sequentially, but may be performed in turn or alternately with other steps or at least a part of the sub-steps or stages of other steps.

The embodiments of the present disclosure further provide one or more non-volatile storage media including computer-executable instructions. When the computer-executable instructions are executed by one or more processors, the processors are caused to execute the foregoing method for unlocking the electronic device according to the above embodiments.

The embodiments of the present disclosure further provide a computer program product including instructions, when the instructions are executed on a computer, the computer is caused to execute the method for unlocking the electronic device according to the above embodiments.

Figure 6:
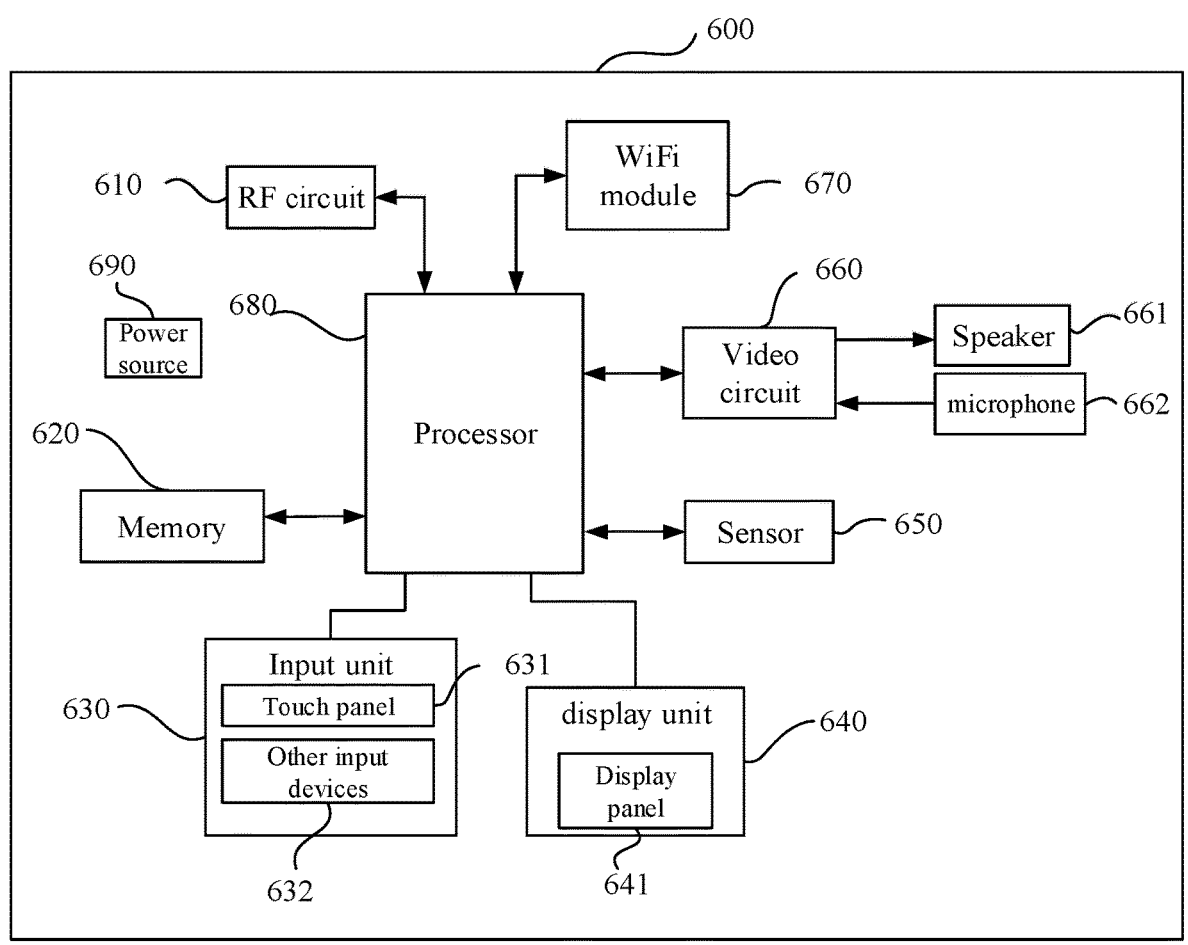
FIG. 6 is a block diagram of a partial structure of a mobile phone related to an electronic device according to an embodiment of the present disclosure.

The embodiments of the present disclosure further provide an electronic device. As illustrated in FIG. 6, for convenience of description, only the parts related to the embodiment of the present disclosure are shown, and for specific technical details that are not disclosed, please refer to the method part of the embodiment of the present application. The electronic device may be any terminal device such as a mobile phone, a tablet computer, a personal digital assistant (PDA), a point of sales (POS), an in-vehicle computer, and a wearable device. The electronic device refers to a mobile phone in this application.

FIG. 6 is a block diagram of a partial structure of a mobile phone related to an electronic device according to an embodiment of the present disclosure. As illustrated in FIG. 6, the mobile phone includes a radio frequency (RF) circuit 610, a memory 620, an input unit 630, a display unit 640, a sensor 650, an audio circuit 660, a wireless fidelity (WiFi) module 670, a processor 680, and a power source 690. Those skilled in the art can understand that the structure of the mobile phone shown in FIG. 6 does not constitute a limitation on the mobile phone, and may include more or fewer components than those shown in the figure, or a combination of some components, or has different component arrangement.

The RF circuitry 610 may be configured to receive or transmit a signal during a process of transmitting or receiving a message or making a call. In at least one embodiment, after downlink data of a base station is received, the downlink data is transmitted to the processor 680 for processing. Additionally, uplink data related is transmitted to the base station. In general, the RF circuitry includes, but not limited to, an antenna, at least one amplifier, a transceiver, a coupler, a low noise amplifier (LNA), a diplexer and the like. Furthermore, the RF circuitry 610 may be further configured to communicate with other devices via wireless communication and network. The wireless communication may adopt any communication standard or protocol, which includes, but not limited to, global system of mobile communication (GSM), general packet radio service (GPRS), code division multiple access (CDMA), wideband code division multiple access (WCDMA), long term evolution (LTE), e-mail, short messaging service (SMS) and the like.

The memory 620 may be configured to store application programs or modules. The processor 680 is configured to execute various functional applications and data processes by running the applications programs stored in the memory 620. The memory 620 may include a program storage region and a data storage region. The program storage region may store an operation system, at least one function-required application programs (such as sound playing function, image displaying function) and the like. The data storage region may store data produced by using the mobile terminal (such as audio data, a contact book) and the like. In addition, the memory 620 may include a high speed random access memory and may include a non-volatility memory, such as at least one disk memory, a flash memory, or other volatility solid state memory.

The input unit 630 may be configured to receive figures, character information and generate key signal inputs related to user settings and function control of the mobile phone 600. Specifically, the input unit 630 may include touch-sensitive surface 631 and other input devices 632. The touch-sensitive surface 631 may be called as a touch panel, and may be configured to collect touch operations near or on the touch-sensitive surface (such as an operation of a user on the touch-sensitive surface or near the touch-sensitive surface with a finger, a stylus or other suitable objects or attachments), and drive corresponding connected device according to a preset program. In an embodiment, the touch-sensitive surface 631 may include a touch detection device and a touch controller. The touch detection device is configured to detect an orientation of the user's touch, detect a signal caused by the touch operation and send the signal to the touch controller. The touch controller is configured to receive the touch information on the touch detection device, convert the touch information to touch point coordinates, and send the touch point coordinates to the processor 680. Furthermore, the touch controller may receive and execute a command sent from the processor 680. In addition, the touch-sensitive surface may be implemented as resistance typed, capacitive typed, infrared typed and surface acoustic wave typed. In addition to the touch-sensitive surface 631, the input unit 630 may further include other input devices 632. In detail, the other input devices 632 may include, but not limited to, one or more of a physical keyboard, a functional key (such as a volume control key and an on/off key).

The display unit 640 may be configured to display information inputted by the user or information provided to the user or various menus of the mobile phone. The display unit 640 may include a display panel 641. In an embodiment, the display panel may be configured as a liquid crystal display (LCD), an organic light-emitting diode (OLED) and the like. Further, the touch-sensitive surface 631 may cover the display panel 641. When the touch-sensitive surface 631 detects the touch operation on or near the touch-sensitive surface, the touch operation is transmitted to the processor 680 to determine a type of the touch event. Thereafter, the processor 680 provides a corresponding visual output on the display panel 641 according to the type of the touch event. Although the touch-sensitive surface 631 and the display panel 641 are used as two separate components to realize an input and output functions illustrated in FIG. 6, in certain embodiments, the touch-sensitive surface 631 and the display panel 641 may be integrated to realize the input and output functions.

The mobile terminal 600 may further include at least one sensor 650, such as an optical sensor, a motion sensor and other sensors. In detail, the optical sensor may include a surrounding light sensor and a proximity sensor. The surrounding light sensor may adjust a brightness of the display panel 641 according to brightness of the surrounding lights. The proximity sensor may light the display panel 641 and/or backlight unit off when the mobile terminal moves near ears of the user. As a kind of motion sensor, a motion sensor may detect acceleration values in various directions (generally three axes), measure a value and a direction of gravity when being static, and identify a status of the phone (such as horizontal screen and vertical screen switching, related games, magnetometer status calibration), shake-related functions (such as a pedometer, a knocking) and the like. Furthermore, the mobile terminal may be configured with a gyroscope, a barometer, a thermometer, an infrared sensor and other sensors, which are not elaborated herein.

The audio circuit 660, the speaker 661, and the microphone 662 may provide an audio interface between the user and the mobile phone. The audio circuit 660 may transmit electric signals converted by the received audio data to the speaker 661, and the speaker 661 converts it into a sound signal for output. On the other hand, the microphone 662 converts the collected sound signal into an electric signal, the audio circuit 660 receives the electric signal and convert the electric signal into voice data, and forward the voice data to the output processor 680 for processing, then the processed voice data can be sent to another phone through RF circuit 610, or output to the memory 620 for subsequent processing.

WiFi is a short-range wireless transmission technology. The mobile phone can help users send and receive e-mail, browse web pages, and access streaming media through the WiFi module 670. It provides users with wireless broadband Internet access. Although FIG. 6 shows the WiFi module 670, it can be understood that the WiFi module 670 does not belong to the necessary configuration of the mobile phone 600, and can be omitted as needed.

The processor 680 is a control center of the mobile phone, and uses various interfaces and lines to connect various parts of the entire mobile phone. By running or executing software programs and/or modules stored in the memory 620, and calling data stored in the memory 620, various functions of the mobile phone and data processing are executed, so as to monitor the mobile phone as a whole. In an embodiment, the processor 680 may include one or more processing units. In an embodiment, the processor 680 may integrate an application processor and a modem-demodulation processor, in which the application processor mainly processes an operating system, a user interface, and an application program, and the like, and the modem-demodulation processor mainly processes wireless communications. It is understood that the foregoing modem-demodulation processor may not be integrated into the processor 680.

The mobile phone 600 further includes a power source 690 (such as a battery) for supplying power to various components. Preferably, the power source can be logically connected with the processor 680 through a power management system, so as to implement functions such as managing charging, discharging, and power consumption management through the power management system.

In an embodiment, the mobile phone 600 may further include a camera, and a Bluetooth module.

In an embodiment of the present application, when the processor 680 included in the electronic device implements the method for unlocking the electronic device provided in the foregoing embodiment by executing a computer program stored in the memory.

Any reference to memory, storage, database, or other media used in this application may include non-volatile and/or volatile memory. Suitable non-volatile memory may include read-only memory (ROM), programmable ROM (PROM), electrically programmable ROM (EPROM), electrically erasable programmable ROM (EEPROM), or flash memory. Volatile memory can include random access memory (RAM), which is used as external cache memory. By way of illustration and not limitation, RAM is available in various forms, such as static RAM (SRAM), dynamic RAM (DRAM), synchronous DRAM (SDRAM), dual data rate SDRAM (DDR SDRAM), enhanced SDRAM (ES-DRAM), synchronous Link (Synchlink) DRAM (SL- DRAM), memory bus (Rambus) direct RAM (RDRAM), direct memory bus dynamic RAM (DRDRAM), and memory bus dynamic RAM (RDRAM).

The technical features of the embodiments described above can be arbitrarily combined. In order to simplify the description, all possible combinations of the technical features in the above embodiments are not described. However, as long as there is no contradiction in the combination of these technical features, it should be considered as the scope described in this specification.

The above-mentioned embodiments only express several implementations of the present application, and the descriptions thereof are more specific and detailed, but cannot be understood as limiting the scope of the invention patent. It should be noted that, for those of ordinary skill in the art, without departing from the concept of the present application, several modifications and improvements can be made, and these all belong to the protection scope of the present application. Therefore, the protection scope of this application shall be referred to the appended claims.

What is claimed is:

1. A method for unlocking an electronic device, comprising:
    receiving actual unlocking information from a locked screen interface;
    comparing the actual unlocking information with preset emergency unlocking information and preset normal unlocking information, unlocking the electronic device when the actual unlocking information is the normal unlocking information;
    analyzing a dynamic use state of the electronic device according to an input condition of the emergency unlocking information on the locked screen interface to obtain an analysis result; and
    when it is determined that the emergency unlocking information is inputted more than once on the locked screen interface, and a distance between the positions where the electronic device is located when the unlocking information is received twice adjacently from the locked screen interface is greater than a preset threshold, setting the emergency unlocking information to be invalid, wherein when the emergency unlocking information is invalid, the electronic device fails to be unlocked.

2. The method according to claim 1, wherein before the emergency unlocking information is received for the first time on the locked screen interface, a state of the emergency unlocking information is valid; and
    when it is determined that the emergency unlocking information is inputted more than once on the locked screen interface, and the distance between the positions where the electronic device is located when the unlocking information is received twice adjacently from the locked screen interface is greater than the preset threshold, setting the emergency unlocking information to be invalid, comprises:
        determining whether the emergency unlocking information is invalid, when the emergency unlocking information is invalid, not executing an unlocking operation, and when the emergency unlocking information is valid, obtaining a first position where the electronic device is currently located and a second position where the emergency unlocking information is received from the locked screen interface last time, and determining whether the emergency unlocking information is received from the locked screen interface for the first time, or a distance between the first position and the second position is less than or equal to the preset threshold, when the emergency unlocking information is received from the locked screen interface for the first time, or the distance between the first position and the second position is less than or equal to the preset threshold, executing the unlocking operation, and when the emergency unlocking information is not received from the locked screen interface for the first time and the distance between the first position and the second position is greater than the preset threshold, setting the emergency unlocking information to be invalid.

3. The method according to claim 2, wherein when the emergency unlocking information is received from the locked screen interface for the first time or the distance between the first position and the second position is less than or equal to the preset threshold, the unlocking operation is executed and a current position of the electronic device is stored.

4. The method according to claim 2, wherein the first position and the second position are wirelessly transferred to the electronic device by other devices.

5. The method according to claim 2, further comprising:
    determining whether the emergency unlocking information is received from the locked screen interface for the first time, comprising:
        determining whether the second position is a set constant; when the second position is the set constant, performing the unlocking operation.

6. The method according to claim 5, wherein when the second position is not the set constant, the method further comprises: determining whether the distance between the first position and the second position is less than or equal to the preset threshold, when the distance between the first position and the second position is less than or equal to the preset threshold, performing the unlocking operation, when the distance between the first position and the second position is greater than the preset threshold, setting the emergency unlocking information to be invalid.

7. The method according to claim 1, wherein the emergency unlocking information is information generated by setting after a user unlocks the electronic device through the normal unlocking information.

8. The method according to claim 1, wherein when it is determined that the analysis result satisfies the unlock invalidation condition, setting the emergency unlocking information to be invalid, comprises:
    when it is determined that the analysis result satisfies the unlock invalidation condition, setting the emergency unlocking information to be invalid, and displaying a prompt message.

9. The method according to claim 1, wherein the unlocking information comprises an unlocking password.

10. An electronic device comprising a memory and a processor, wherein a computer program is stored in the memory, and when the program is executed by the processor, the processor is caused to:
    receive actual unlocking information from a locked screen interface;
    compare the actual unlocking information with preset emergency unlocking information and preset normal unlocking information, unlock the electronic device when the actual unlocking information is the normal unlocking information;
    analyze a dynamic use state of the electronic device according to an input condition of the emergency unlocking information on the locked screen interface to obtain an analysis result; and when it is determined that the emergency unlocking information is inputted more than once on the locked screen interface, and a distance between the positions where the electronic device is located when the unlocking information is received twice adjacently from the locked screen interface is greater than a preset threshold, set the emergency unlocking information to be invalid, wherein when the emergency unlocking information is invalid, the electronic device fails to be unlocked.

11. The electronic device according to claim 10, wherein before the emergency unlocking information is received for the first time on the locked screen interface, a state of the emergency unlocking information is valid; and when it is determined that the emergency unlocking information is inputted more than once on the locked screen interface, and the distance between the positions where the electronic device is located when the unlocking information is received twice adjacently from the locked screen interface is greater than the preset threshold, setting the emergency unlocking information to be invalid, comprises:

determining whether the emergency unlocking information is invalid, when the emergency unlocking information is invalid, not executing an unlocking operation, and when the emergency unlocking information is valid, obtaining a first position where the electronic device is currently located and a second position where the emergency unlocking information is received from the locked screen interface last time, and determining whether the emergency unlocking information is received from the locked screen interface for the first time, or a distance between the first position and the second position is less than or equal to the preset threshold, when the emergency unlocking information is received from the locked screen interface for the first time, or the distance between the first position and the second position is less than or equal to the preset threshold, executing the unlocking operation, and when the emergency unlocking information is not received from the locked screen interface for the first time and the distance between the first position and the second position is greater than the preset threshold, setting the emergency unlocking information to be invalid.

12. The electronic device according to claim 11, wherein when it is determined that the emergency unlocking information is received from the locked screen interface for the first time, or the distance between the first position and the second position is less than or equal to the preset threshold, executing an unlocking operation, and storing a current location of the electronic device.

13. The electronic device according to claim 10, wherein the emergency unlocking information is information generated by setting after a user unlocks the electronic device through the normal unlocking information.

14. The electronic device according to claim 10, wherein when it is determined that the analysis result satisfies the unlock invalidation condition, setting the emergency unlocking information to be invalid, comprises:

when it is determined that the analysis result satisfies the unlock invalidation condition, setting the emergency unlocking information to be invalid, and displaying a prompt message.

15. The electronic device according to claim 10, the unlocking information comprises an unlocking password.

16. A non-transitory storage media comprising computer-executable instructions, wherein when the computer-executable instructions are executed by one or more processors, the one or more processors are caused to:

receive actual unlocking information from a locked screen interface;

compare the actual unlocking information with preset emergency unlocking information and preset normal unlocking information, unlock an electronic device when the actual unlocking information is the normal unlocking information;

analyze a dynamic use state of the electronic device according to an input condition of the emergency unlocking information on the locked screen interface to obtain an analysis result; and when it is determined that the emergency unlocking information is inputted more than once on the locked screen interface, and a distance between the positions where the electronic device is located when the unlocking information is received twice adjacently from the locked screen interface is greater than a preset threshold, set the emergency unlocking information to be invalid, wherein when the emergency unlocking information is invalid, the electronic device fails to be unlocked.

* * * * *